United States Patent [19]

Gallagher et al.

[11] 4,380,605

[45] Apr. 19, 1983

[54] ROOM TEMPERATURE CROSSLINKING UNSATURATED POLYESTER RESINS

[75] Inventors: Ronald B. Gallagher, Lancaster; Michael F. Novits, Buffalo, both of N.Y.

[73] Assignee: Pennwalt Corporation, Philadelphia, Pa.

[21] Appl. No.: 304,136

[22] Filed: Sep. 21, 1981

[51] Int. Cl.³ ............................................. C08G 63/76
[52] U.S. Cl. ..................................... 525/14; 523/503; 523/507; 525/17; 525/23; 525/24; 525/27
[58] Field of Search ...................... 525/14, 17, 23, 24, 525/27; 523/503, 507

[56] References Cited

U.S. PATENT DOCUMENTS 3,920,590  11/1975  Jacobs et al. .......................... 525/17

FOREIGN PATENT DOCUMENTS 558928  6/1958  Canada .................................. 525/23

*Primary Examiner*—J. Ziegler

[57] ABSTRACT

The crosslinking of unsaturated polyester resins at room temperature in the presence of a peroxyester initiator is accelerated by a mercapto compound and a metal salt wherein the metal is selected from the group consisting of copper, and iron, or a mixture of the metal salts.

10 Claims, No Drawings

ROOM TEMPERATURE CROSSLINKING UNSATURATED POLYESTER RESINS

BACKGROUND OF THE INVENTION

The present invention pertains to the room temperature crosslinking of unsaturated polyester resins and more particularly, to accelerating the room temperature crosslinking of such polyester resins with an organosulfur compound and metal salts.

Organosulfur compounds and metal salts are known in the prior art for accelerating (also called promoting) the room temperature crosslinking of unsaturated polyester resins in the presence of an organic peroxide. U.S. Pat. No. 2,946,770 discloses the use of an organic sulphonium compound in combination with a quaternary ammonium compound and a copper or iron salt to accelerate the polymerization time. U.S. Pat. No. 3,333,021 teaches the use of mercaptans in combination with vanadium salts as an accelerator system. British Pat. No. 1,170,983 discloses the use of a 2-mercaptoalcohol in combination with a cobalt or vanadium salt as an accelerator. None of these patents teaches the present invention.

SUMMARY OF THE INVENTION

The present invention is directed to a process of crosslinking an unsaturated polyester resin comprising admixing to said unsaturated resin (a) an initiating amount of a peroxyester,
(b) at least one mercapto compound, and
(c) an inorganic metal salt wherein the metal is selected from the group consisting of iron and copper or a mixture of the metal salts, and crosslinking the admixture at room temperature.

DETAILED DESCRIPTION OF THE INVENTION

It has now been found that unsaturated polyester resins can be crosslinked (also called cured) rapidly and thoroughly at room temperature using a peroxyester initiator and an accelerator system of a mercapto compound and inorganic metal salts.

The unsaturated polyester resins used in this invention are reactive resins dissolved in a polymerizable monomer or mixture of monomers. These reactive resins are formed by condensing a saturated dicarboxylic acid or anhydride and an unsaturated dicarboxylic acid or anhydride with a dihydric alcohol. Examples of these polyester resins are the products of the reaction of a saturated dicarboxylic acid or anhydride (e.g., phthalic anhydride, isophthalic acid, tetrahydrophthalic anhydride, hexahydrophthalic anhydride, endomethylene tetrahydrophthalic anhydride, tetrachlorophthalic anhydride, hexachloroendomethylene tetrahydrophthalic acid, succinic acid, glutaric acid, adipic acid, pimelic acid, suberic acid, azelaic acid or sebacic acid) and an unsaturated dicarboxylic acid or anhydride (e.g., maleic anhydride, fumaric acid, chloromaleic acid, itaconic acid, citraconic acid or mesaconic acid) with a dihydric alcohol (e.g., ethylene glycol, propylene glycol, butylene glycol, diethylene glycol, triethylene glycol or neopentyl glycol). Small amounts of a polyhydric alcohol (e.g., glycerol, pentaerythritol, trimethylopropane or sorbital) may be used in combination with the glycol.

A three-dimensional structure is produced by reacting the unsaturated polyester through the unsaturated acid component with an unsaturated monomer which is capable of reacting with the polyester resin to form cross-linkages. Suitable unsaturated monomers include styrene, methylstyrene, dimethylstyrene, vinyltoluene, divinylbenzene, dichlorostyrene, methyl acrylate, ethyl acrylate, methylacrylayte, diallyl phthalate, vinyl acetate, triallyl cyanurate, acrylonitrile, acrylamide and mixtures thereof. The relative amounts of the unsaturated polyester resin and the unsaturated monomer in the composition may be varied over a wide range.

The unsaturated polyester resin compositions generally contain 20% to 80% by weight of the monomer, the monomer content preferably being in the range from 30% to 70% by weight.

Also included among useful reactive resins are those resins which are terminated by polymerizable unsaturated ester functions but wherein the polymer repeating units may or may not be of the polyester type, for example, polyethers terminated with acrylic acid ester groups, blended with suitable copolymerizable monomers. A typical series of such resins are commercially available from Dow Chemical Corp. under the trademark "Derakane" resins and generally comprise polyethers prepared from an epoxide (e.g., glycidol) and a bisphenol (e.g., 2,2-di(4-hydroxyphenyl) propane or bisphenol A which are terminated by acrylic acid ester functions and blended with styrene. A more detailed description of vinyl ester resins may be found in "Unsaturated Polyester Technology", Gordon and Breach Science Publishers, New York 1976, p 315 and in Developments in Reinforced Plastics—1 edited by G. Pritchard, published by Applied Science Publishers Ltd., England 1980.

To simplify discussion in the remainder of this text the term polyester resin will be used to describe both unsaturated polyester resins and polyether resins with terminal unsaturation (Derakane types).

In the practical utilization of polyester resins, it is common to incorporate fillers and reinforcements. Fillers are substances added to polyester resin before curing to enhance various properties of the final product or to reduce its cost. Bulk fillers such as carbonates and clays are used to decrease the cost of the final product, to give better flow characteristics to the resin, and to provide a smoother surface on the finished laminate. Another advantage of bulk fillers is that they absorb some of the exothermic heat of the curing reaction. This lessens internal strains and reduces thermal expansion and shrinkage. Other fillers such as hydrated alumina increase fire resistance of the final products.

Reinforcing fillers include such fibrous materials as glass, quartz, cotton, nylon, asbestos and sisal. They are usually incorporated into the resin to improve strength, particularly impact and flexural strengths.

A wide variety of fillers and reinforcements have been found to be compatible with the curing process of this invention.

To utilize the many advantages of the process of this invention, any number of a variety of methods known to those skilled in the art may be used to convert the reactive liquid resin into a useful thermoset solid. The process of this invention is particularly suited to such known methods as spray-up, hand lay-up, resin injection, centrifugal casting, filament winding, wet compression molding, continuous laminating, casting and encapsulation.

The peroxidic compounds of this invention are the peroxyesters. Peroxyesters are widely used as initiators for free radical polymerization and crosslinking at elevated temperatures (>150° F.). A detailed description of peroxyesters and their use in curing unsaturated polyester resins may be found in the following reference, V. R. Kamath and R. B. Gallagher, "Initiator Systems for Unsaturated Polyester Resins", Developments in Reinforced Plastics—I, published by Applied Science Publishers Ltd., England 1980, pp 121-144.

Peroxyesters have the general structure

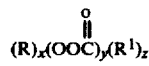

wherein x, y and z are 1 or 2 with the provisos that when x, y and z are 1, R is selected from the group consisting of a substituted or unsubstituted tertiary-alkyl of 4 to 8 carbons, tertiary-alkynyl of 5 to 8 carbons, tertiary-cycloalkyl of 6 to 10 carbons and tertiary-aralkyl of 9 to 12 carbons, and $R^1$ is selected from the group consisting of hydrogen, a substituted or unsubstituted primary, secondary or tertiary-alkyl of 1 to 20 carbons, alkenyl of 2 to 20 carbons, alkynyl of 2 to 20 carbons, cycloalkyl of 5 to 10 carbons, aralkyl of 7 to 14 carbons, aryl of 6 to 10 carbons, alkoxy of 1 to 20 carbons, cycloalkoxy of 5 to 10 carbons or aralkoxy of 7 to 12 carbons, when x and y are 2 and z is 1, R is the same as defined above, and $R^1$ is selected from the group consisting of a substituted or unsubstituted alkylene diradical of 1 to 10 carbons, alkynelene diradical of 2 to 10 carbons, alkenylene diradical of 2 to 10 carbons, cycloalkylene diradical of 5 to 10 carbons, arylene diradical of 6 to 10 carbons, alkylenedioxy diradical of 2 to 10 carbons, oxyalkylenedioxy of 4 to 10 carbons, and cycloalkylenedioxy of 5 to 10 carbons, and when y and z are 2 and x is 1, R is selected from the group consisting of a substituted or unsubstituted di-tertiary-alkylene diradical of 7 to 10 carbons, di-tertiary-alkynelene diradical of 8 to 10 carbons, di-tertiary-cycloalkylene diradical of 7 to 12 carbons, and di-tertiary-aralkylene diradical of 12 to 18 carbons, and $R^1$ is the same as when x, y and z are 1, the substituents for R and $R^1$ being lower alkyl of 1 to 4 carbons, Cl, F, Br, cyano, carboxy, lower alkoxycarbonyl, lower acyloxy, aroyloxy of 7 to 10 carbons, lower alkoxy and

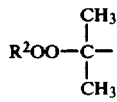

wherein $R^2$ is the same as defined above for R when x, y and z are 1.

Specific examples of particularly preferred peroxyesters of this invention are t-butyl peroxybenzoate, t-butyl peroxyacetate, t-butyl peroxyisobutyrate, t-butyl peroxy-2-ethylhexanoate, t-butyl peroxypivalate, t-amyl peroxypivalate, t-butyl peroxyneodecanoate, t-butyl peroxymaleic acid, di-t-butyl diperoxyphthalate, OO-t-butyl O-isopropyl peroxycarbonate, 2,5-dimethyl-2,5-bis(2-ethylhexanoylperoxy)hexane, 2,5-dimethyl-2,5-bis(benzoylperoxy)hexane, t-amyl peroxy-2-ethylhexanoate, t-amyl peroxybenzoate, OO-t-butyl O-2-ethylhexyl monoperoxycarbonate, di-t-butyl diperoxyazelate, and OO-t-amyl O-2-ethylhexyl monoperoxycarbonate.

In activated cure systems, activity is independent of half-life temperatures of peroxides. Therefore, the preferred peroxyester is one which exhibits good thermal stability and ease of handling. In this respect, t-butyl peroxybenzoate is a preferred initiator. In this invention one can use mixtures of two or more peroxides wherein at least one of the peroxides is a peroxyester as defined above. These types of mixtures are useful for obtaining specific processing or economic advantages. Thus, a mixture of t-butyl peroxybenzoate and cumene hydroperoxide leads to rapid gel times and fully cured resin even in thin layers. This mixture would have the added advantage of being less expensive. Along similar lines, one can use a mixture of t-butyl peroxybenzoate and 1,1-di(t-butylperoxy) cyclohexane might be used to cure the resin at ambient temperatures. The undecomposed peroxyketal could then be thermally activated by post curing the part at elevated temperatures. Cured resin with low residual monomer content could then be obtained more rapidly than in the absence of the peroxyketal.

In practicing the process of this invention, an amount of peroxyester effective for providing an optimum cure rate is added to the unsaturated polyester resin. Generally, the peroxyester compound is added in a proportion to provide from about 0.1 to about 5.0 parts, and preferably about 0.5 to 2.0 parts peroxyester per 100 parts by weight of the polyester resin (phr) including unsaturated monomer. The amount of peroxyester can be varied within this particular range depending on the result desired.

When a mixture of peroxides is used, the total concentration of initiator would be preferably about 0.5 to 2.0 parts by weight per 100 parts by weight of the polyester resin including unsaturated monomer(s). In this case, the concentration of peroxyester(s) would be at least about 0.1 to 1.0 part by weight per 100 parts by weight of polyester resin.

The mercapto compounds which are used in this invention are those which contain the mercapto radical or metal salts formed therefrom and have the general structure $(R^3)_m(S)_n(M)_\sigma$ where m and n are 1, 2 or 3 and $\sigma$ is 1 or 2, with the provisos that when m, n, and $\sigma$ are 1, M is hydrogen and $R^3$ is selected from the group consisting of a substituted or unsubstituted alkyl of 1 to 18 carbons, aryl of 6 to 14 carbons, cycloalkyl of 5 to 10 carbons, aralkyl of 7 to 14 carbons,

heterocyclic of 2 to 10 carbons and 1 to 3 nitrogen, sulfur or oxygen atoms, wherein $R_1$ and $R_2$ are independently selected from the group consisting of hydrogen, lower alkyl of 1 to 4 carbons, aryl of 6 to 12 carbons and cycloalkyl of 5 to 10 carbons, and when m and n are 2 or 3, $\sigma$ is 1, M is selected from the group consisting of copper and iron, and $R^3$ is the same as mentioned above, and when n and $\sigma$ are 2 and m is 1, M is hydrogen and $R^3$ is selected from the group consisting of a substituted or unsubstituted alkylene diradical of 2 to 20 carbons, cycloalkylene diradical of 5 to 15 carbons, arylene diradical of 6 to 14 carbons, and a heterocyclic diradical of 2 to 10 carbons and 1 to 3 nitrogen, sulfur or oxygen atoms, and wherein substituents for $R^3$ being selected from lower alkyl of 1 to 4 carbons, F, Cl, Br, cyano, alkoxycarbonyl of 1 to 6 carbons, acyloxy of 1 to 20 carbons, aroyloxy of 7 to 10 carbons and alkoxy of 1 to 6 carbons.

Compounds in which the mercapto group can exist in equilibrium with another chemical structure are useful. For example, in the case of thiourea or substituted thioureas the mercapto radical can exist in equilibrium

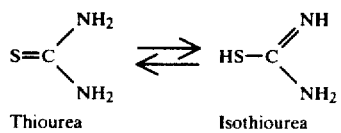

Thiourea          Isothiourea

Examples of the variety of mercapto compounds which can be used in this invention are as follows: 2-mercaptobenzothiazole (MBT), n-dodecylmercaptan, n-octadecylmercaptan, d-limonene dimercaptan, methyl-3-mercaptopropionate, 2-mercapto ethyl palmitate, dibutyl mercaptosuccinate, isothiourea, ethylene isothiourea, ferrous mercaptobenzothiazolate, and cupric mercaptobenzothiazolate.

One of the preferred mercapto compounds is 2-mercaptobenzothiazole (MBT). This compound is preferred because it produces significant acceleration, has essentially no odor, and is available commercially in large quantities.

Mixtures of mercapto compounds can also be used in this invention. Such mixtures allow one to regulate the rate of cure and, thus, obtain better processing control. In addition, mixtures of mercapto compounds may also be used to improve the extent of cure, i.e., reduce surface tackiness especially in thin molded samples.

Generally the amount of mercapto compound required is from about 0.05 to 5.0 parts and preferably from about 0.1 to 2.5 parts mercapto compound per 100 parts by weight of the polyester resin (phr) including unsaturated monomer. The amount of mercapto compound can be varied within this particular range depending on the result desired.

Organic salts of transition metals such as cobalt and vanadium are commonly used as accelerators (promoters). Often the polyester resin is prepromoted so that the fabricator needs only to add the required peroxide. Keeping this in mind, we have found that inorganic salts of metals such as copper and iron are particularly preferred as accelerators in our invention. These inorganic salts include hydrated salts of copper and iron. Specific examples include cuprous chloride, cupric chloride, ferric chloride and ferrous chloride. These salts act as good accelerators and in addition provide long shelf-life to the prepromoted resin, which is very desirable.

Salts of cobalt and vanadium have the added disadvantage of giving a strong color (pink or green respectively) to the cured piece. This is especially undesirable in clear gel coat applications. Using halide salts of copper and iron as accelerators in this invention overcomes this disadvantage.

Specific examples of useful metal salts include cuprous chloride, cupric chloride, ferric chloride, ferrous chloride, and their hydrated salts.

An essential compound of this invention is cupric chloride, since it is effective at extremely low concentrations. A particularly preferred mixture of metal compounds is that of cupric chloride and ferric chloride, since this mixture offers improved reactivity as compared to the use of a single metal compound while providing increased shelf life of the prepromoted resin. For example, when the accelerator system consists of a combination of a mercaptan, such as mercaptobenzothiazole (MBT), and a metal salt, such as cupric chloride, the shelf-life of the resin is less than eight hours. However, when ferric chloride is added in addition to cupric chloride, the shelf-life is greater than 2 months and, in addition, the cure activity is increased.

To facilitate mixing of the metal compound with the resin, it is preferable to first dissolve the metal compound. Suitable solvents would include, toluene, xylene, dimethylformamide, mineral spirits, dimethyl sulfoxide, water, methanol, diethyleneglycol, methylene chloride, methyl ethyl ketone, ethyl acetate, hexane, diallyl phthalate and styrene.

Generally the optimum amount of metal compound(s) used is dependent upon the specific metal compound and is influenced by compound characteristics such as solubility and compatibility in the system. Generally 0.00001 to 0.50 part and preferably from about 0.0001 to 0.05 part of metal per 100 parts by weight of the polyester resin (phr) including unsaturated monomer.

It is well known to those skilled in the art that organic peroxides and accelerators (promoters) should not be mixed together directly. Such direct contact between peroxides and promoters can result in hazardous decomposition of the peroxide. To avoid such contact the reactive ingredients are preferably added to the resin in the following order: metal salt(s), mercapto compound(s), peroxyester(s). Each ingredient should be thoroughly mixed into the resin before adding the next ingredient. The peroxyester may also be added as a second component in the processes (e.g., spray-up) where the equipment is designed to dispense a mixture of resin and promoters as one component and peroxide as a separate component.

EXAMPLES

The following examples are provided to illustrate preferred embodiments of the invention and are not intended to restrict the scope thereof. All parts are parts by weight and all percentages are expressed as weight percentages.

EXAMPLE I

Into a 9 oz. waxed paper cup was weighed 100 grams of Laminac 4123 resin followed by 0.3 grams of mercaptobenzothiazole. After mixing thoroughly, 0.0003 grams of cupric chloride was added as a 5% solution in methanol. After mixing thoroughly, 1.0 gram of t-butyl peroxybenzoate was added to the resin. A timer was started and the peroxide was mixed thoroughly and uniformly into the resin with a glass stirring rod. The resin mixture was poured into a 4 oz. glass jar which was immersed in a 30° C. constant temperature water bath to the level of the resin. A thermocouple was located at the center of the resin mass to record exotherm temperature. The time when the resin gelled was recorded as the gel time. The resin was considered gelled when inserting a stirring rod and raising a portion of the resin out of the jar resulted in a string of resin that would snap instead of stretch elastically. The time at which the peak temperature was reached was recorded as the cure time. The peak exotherm temperature was also recorded. The Barcol hardness was measured after 24 hrs. at room temperature. The range of 10 hardness readings was recorded, i.e., 40–45.

|  | Parts by weight | | |
| --- | --- | --- | --- |
|  | 1 | 2 | 3 |
| Laminac 4123[a] | 100 | 100 | 100 |
| t-Butyl Peroxybenzoate | 1.0 | 1.0 | 1.0 |
| Mercaptobenzothiazole | — | 0.3 | 0.3 |
| Cupric Chloride[b] | — | — | 0.0003 |
| Gel Time (min.) | 200 hrs. | 240 min. | 16. min. |
| Cure Time (min.) | — | — | 34 min. |
| Peak Exotherm (°C.) | — | — | 155° |
| Barcol Hardness[c] (24 hrs.) | — | — | 40–45 |

[a]Orthophthalic type resin, U.S.S. Chemicals
[b]Added as a 5% solution of $CuCl_2.2H_2O$ in methanol
[c]Measured after 24 hrs. at room temperature using Barcol impressor (Model 934-1), Barber-Colman Co.

EXAMPLE II

The following experiments (1–12) illustrate the variety of peroxyesters which may be effectively used in this invention. The procedure used was that defined in Example I. The resin formulation is shown below:

|  | Parts by Wt. |
| --- | --- |
| Resin (OCF E701)[a] | 100.0 |
| Mercaptobenzothiazole | 0.40 |
| 5% $CuCl_2.2H_2O$ in methanol | 0.03 |
| 50% $FeCl_3.6H_2O$ in water | 0.03 |
| Peroxide | (as shown in table) |

| Exp. # | Peroxyesters | Peroxyester Conc. (phr) | Gel (min) | Cure (min) | Peak °C. | Barcol |
| --- | --- | --- | --- | --- | --- | --- |
| 1 | t-Butyl Peroxybenzoate | 1.0 | 7.0 | 17.0 | 207 | 35–40 |
| 2 | t-Butyl Peroxy-2-ethyl-hexanoate | 1.0 | 6.5 | 14.5 | 204 | 30–35 |
| 3 | 2,5-Dimethyl-2,5-bis(2-ethyl-hexanoylperoxy)-hexane | 0.5 | 12.5 | 23.0 | 188 | 25–30 |
| 4 | t-Butyl Peroxyisobutyrate | 1.0 | 6.0 | 14.0 | 208 | 30–35 |
| 5 | OO—t-Butyl O—Isopropyl Monoperoxy-carbonate | 1.0 | 10.0 | 21.0 | 206 | 30–40 |
| 6 | t-Butyl Peroxyacetate | 1.0 | 8.0 | 17.0 | 209 | 30–40 |
| 7 | Di-t-Butyl Diperoxyazelate | 0.5 | 10.0 | 21.0 | 193 | 25–40 |
| 8 | 2,5-Dimethyl-2,5-bis(benzoyl-peroxy)hexane | 0.5 | 11.0 | 24.0 | 184 | 20–35 |
| 9 | t-Amyl Peroxy-2-ethyl-hexanoate | 1.0 | 6.0 | 14.0 | 205 | 30–40 |
| 10 | Di-t-Butyl Diperoxy-phthalate | 0.5 | 4.0 | 16.0 | 195 | 35–40 |
| 11 | t-butyl peroxymaleic acid | 1.0 | 7.5 | 19.0 | 199 | 30–40 |
| 12 | t-amyl peroxybenzoate | 1.0 | 7.5 | 18.0 | 205 | 35–40 |
| 13 | OO—t-butyl O—2-ethylhexyl-peroxycarbonate | 1.0 | 11.0 | 22.0 | 201 | 30–40 |
| 14 | OO—t-amyl O—2-ethylhexyl-peroxycarbonate | 1.0 | 12.0 | 23.0 | 197 | 30–40 |
| 15 | t-octyl peroxyneo-hexanoate | 1.0 | 14.0 | 22.5 | 191 | 30–40 |

[a]Isophthalic polyester resin containing approximately 45% by weight styrene monomer. Resin solids have an acid value of 10. Available from Owens Corning Fiberglass.

EXAMPLE III

The following experiments compare the cure activity obtained using the process of this invention to the cure activity obtained with a common (standard) cure system.

To facilitate addition of the promoter to the resin a solution of the mercaptans and metal salts was prepared as a master batch using dimethyl formamide as the solvent.

| Promoter Solution A Ingredient | Wt. % |
| --- | --- |
| mercapto benzothiazole | 48.1 |
| $CuCl_2.2H_2O$ | 0.10 |
| $FeCl_3.6H_2O$ | 2.75 |
| n-dodecylmercaptan | 1.72 |
| N,N—dimethyl formamide | 47.3 |

Promoter solution A was added to the polyester resin (OCF-E701) and after mixing thoroughly t-butyl peroxybenzoate was added. The "standard" cure system used for comparison consists of cobalt neodecanoate (6%) and a commercial methyl ethyl ketone peroxide containing 9% active oxygen (sold under the trademark LUPERSOL DDM-9). Concentrations and cure activity are shown in the following table. The resin was cured in a 5.5" diameter plastic mold. Thickness of the cured resin was approximately 0.23". Initial resin temperature was 22° C.

| Experiment # | 1 | 2 |
| --- | --- | --- |
| OCF Resin E701 (g) | 100 | 100 |
| Promoter Solution A (g) | 1.46 | — |
| t-butyl peroxybenzoate (g) | 0.50 | — |
| 6%-Cobalt neodecanoate (g) | — | 0.80 |
| Lupersol DDM-9 (g) | — | 1.2 |
| Cure Activity | | |
| Gel Time (min) | 6.0 | 5.0 |
| Time to peak exotherm (min) | 21.0 | 22.0 |
| Peak Exotherm (°C.) | 116 | 43 |
| Surface Tackiness | none | sticky |
| 48 hr. Barcol Hardness: | | |
| top | 30–40 | 0 |
| bottom | 35–40 | 0 |

This example demonstrates that this invention gives good cures at much lower peroxide concentrations than are possible with a standard cure system.

EXAMPLE IV

EFFECT OF VARIOUS MERCAPTO COMPOUNDS

This example illustrates the variety of mercaptan compounds which have been found useful in this invention.

|  | Grams |
| --- | --- |
| Laminac 4123 | 100 |
| 5% $CuCl_2$[c] | 0.007 |

| -continued | |
|---|---|
| 50% FeCl$_3$[d] | 0.025 |
| t-butyl peroxybenzoate | 1.0 |

[c]Solvent is methanol
[d]Solvent is dimethylformamide

Results:

| Exp. # | 0.2 phr mercaptan | 30° C. Gel (min) |
|---|---|---|
| 1. | Control (no mercaptan) | >500 |
| 2. | n-Octadecyl mercaptan | 1.0 |
| 3. | d-limonene dimercaptan | 1.0 |
| 4. | Methyl-3-mercaptopropionate | 0.5 |
| 5. | 2-Mercapto ethyl palmitate | 35.0 |
| 6. | Dibutyl mercaptosuccinate | 2.0 |

EXAMPLE V

EFFECT OF VARIOUS COPPER SALTS ON CURE ACTIVITY AT 30° C.

The following results indicate that both organic and inorganic salts of copper are useful in this invention.

| | Parts by Weight | | |
|---|---|---|---|
| Item | 1 | 2 | 3 |
| Laminac 4123 | 100 | 100 | 100 |
| t-Butyl peroxybenzoate | 1.0 | 1.0 | 1.0 |
| Mercaptobenzothiazole | 0.3 | 0.3 | 0.3 |
| 8% Copper naphthenate | 0.24 | — | — |
| Copper acetate | — | 0.10 | — |
| Cupric chloride | — | — | 0.0003 |
| Gel time (min) | 16 | 24 | 16 |
| Cure time (min) | 28 | 38 | 34 |
| Peak Exotherm (°C.) | 163 | 157 | 155 |
| Barcol Hardness (24 hr) | 40–45 | 40–45 | 40–45 |

| | Grams |
|---|---|
| Laminac 4123 | 100 |
| Mercaptobenzothiazole | 0.2 |
| t-Butyl peroxybenzoate | 1.0 |
| 5% CuCl$_2$ | (as in table below) |

Results:

| 5% CuCl$_2$ (g)[b] | Copper Conc. (ppm) | Gel (min) | Cure (min) | Peak (°C.) | Barcol (24 hr) |
|---|---|---|---|---|---|
| 0.007 | 1.6 | 18 | 36 | 156 | 40–45 |
| 0.013 | 3.3 | 8 | 22 | 157 | 40–45 |
| 0.025 | 6.0 | 3 | 16 | 158 | 40–45 |
| 0.035 | 8.0 | 1 | 12 | 158 | 40–45 |
| 0.047 | 11.0 | 1 | 11 | 157 | 40–45 |
| 0.072 | 17.0 | <0.5 | 12 | 146 | 30–40 |
| 0.12 | 28 | <0.5 | 21 | 126 | 0–30 |

[b]5% CuCl$_2$ in methanol.

Results indicate that cure time goes through a minimum in range of 10–15 ppm copper and that high levels of copper, for example 28 ppm, can cause slower reactivity and result in poor cures.

EXAMPLE VII

This example illustrates the present invention (Experiment #3) and also illustrates the fact that initiators other than peroxyesters do not function. Experiment Nos. 1 and 2 illustrate the dramatic effect of FeCl$_3$ on the shelf-life. Experiment Nos. 4, 6 and 9 illustrate that peroxyketals, diacyl peroxides and dialkyl peroxides respectively do not function in the present invention.

Experiment No. 10 illustrates that quaternary ammonium compounds are a necessary part of the accelerator system for diacyl peroxides such as benzoyl peroxide (sa U.S. Pat. No. 2,946,770).

| | Room Temperature Cure of Unsaturated Polyester Resin (Parts by Weight) | | | | | | | | | |
|---|---|---|---|---|---|---|---|---|---|---|
| Experiment No. | 1 | 2 | 3 | 4 | 5 | 6 | 7 | 8 | 9 | 10 |
| Resin OCF E701 | 100 | 100 | 100 | 100 | 100 | 100 | 100 | 100 | 100 | 100 |
| Mercaptobenzo thiazole | 0.40 | 0.40 | 0.40 | 0.40 | 0.40 | 0.40 | 0.40 | 0.40 | 0.40 | 0.4 |
| 5% CuCl$_2$.2H$_2$O | 0.03 | 0.03 | 0.03 | 0.03 | — | 0.03 | — | 0.03 | — | 0.03 |
| 50% FeCl$_3$.6H$_2$O | — | 0.03 | 0.03 | 0.03 | — | 0.03 | — | 0.03 | — | 0.03 |
| 3% Vanadium Naphthenate | — | — | — | — | 0.2 | — | 0.2 | — | — | — |
| t-Butyl Peroxybenzoate | — | — | 1.0 | — | — | — | — | — | — | — |
| 1,1-Bis(t-butylperoxy)3,3,5-trimethyl cyclohexane | — | — | — | 1.0 | 1.0 | — | — | — | — | — |
| Benzoyl Peroxide | — | — | — | — | — | 1.0 | 1.0 | — | — | 1.0 |
| 2,5-Dimethyl-2,5-bis-(t-butylperoxy)hexane | — | — | — | — | — | — | — | 1.0 | 1.0 | — |
| Benzyltrimethyl Ammonium Chloride | — | — | — | — | — | — | — | — | — | 0.5 |
| Gel Time (days) (shelf-life) | 7 | 180 | 7 (min.) | 1.5 | >1 | >4 | >1 | 2.5 | >1 | 0.5 |
| Cure Time | — | — | 17 (min.) | — | — | — | — | — | — | — |
| Peak Exotherm (°C.) | — | — | 207° | — | — | — | — | — | — | — |

EXAMPLE VI

[Effect of CuCl$_2$ Concentration on Cure Activity]

This example illustrates the effect of the concentration of cupric chloride on the cure characteristics of an orthophthalic type unsaturated polyester resin at 30° C. Gel time, cure time, and peak exotherm temperature were determined using the standard SPI procedure.[a] Cupric chloride was added to the following resin formulation.

(a) SPI test procedure reference, 24th Annual Technical Conference, 1969 Reinforced Plastics/Composites Division, The Society of the Plastics Industry.

EXAMPLE VIII

This example illustrates the use of metal salts of mercapto compounds as accelerators for peroxyesters.

| | 1 | 2 | 3 | 4 |
|---|---|---|---|---|
| Laminac 4123 | 100 | 100 | 100 | 100 |
| Cupric mercaptobenzothiazolate | — | 1.5 | 0.1 | 0.1 |
| Ferrous mercaptobenzothiazolate | — | — | 0.4 | — |
| Mercaptobenzothiazole | — | — | — | 0.4 |
| t-Butyl peroxybenzoate | 1.0 | 1.0 | 1.0 | 1.0 |

-continued

|  | 1 | 2 | 3 | 4 |
|---|---|---|---|---|
| Room temp gel time (min) | >500 | 56 | 21 | 13 |

EXAMPLE IX

This example illustrates the use of peroxide mixtures.

|  | 1 | 2 | 3 |
|---|---|---|---|
| Resin OCF E701 | 100 | 100 | 100 |
| Mercaptobenzo-thiazole | 0.70 | 0.70 | 0.70 |
| Dodecyl mercaptan | 0.02 | 0.02 | 0.02 |
| 5% $CuCl_2$ in dimethyl formamide | 0.02 | 0.02 | 0.02 |
| 50% $FeCl_3$ in water | 0.04 | 0.04 | 0.04 |
| t-Butyl peroxybenzoate | 1.0 | 0.5 | 0.6 |
| t-Butyl peroxy-2-ethylhexanoate | — | 0.5 | — |
| 1,1-Bis(t-butylperoxy) 3,3,5-trimethyl cyclohexane | — | — | 0.4 |
| Room temp gel time (min) | 10 | 10 | 11 |

Experiment No. 2 illustrates the use of a mixture of two peroxyesters while experiment No. 3 illustrates the use of a mixture consisting of a peroxyester in combination with a peroxyketal.

What is claimed:

1. A process of crosslinking an unsaturated polyester resin comprising admixing to said unsaturated resin
   (a) an initiating amount of at least one peroxyester,
   (b) mercaptobenzothiazole, and
   (c) an inorganic metal salt wherein the metal is selected from the group consisting of iron, copper and a mixture of the metal salt, and crosslinking the admixture at room temperature.

2. The process of claim 1 wherein the peroxyester is used in the amount of from about 0.1 to about 5.0 parts by weight.

3. The process of claim 1 wherein the mercapto compound is used in the amount from about 0.05 to 5.0 parts per 100 parts by weight of the polyester resin.

4. The process of claim 1 wherein the copper salt and additional metal salt together are used in the amount from about 0.00001 to about 0.50 part of metal per 100 parts by weight of the polyester resin.

5. The process of claim 1 wherein the ingredients are added to the unsaturated polyester resin in the order of metal salts, mercapto compounds, and finally the peroxyester, wherein each ingredient is thoroughly mixed into the unsaturated polyester resin before the next ingredient is added.

6. The process of claim 1 wherein the unsaturated polyester resin is a polyester containing 20 to 80% by weight of a monomer.

7. The process of claim 6 wherein the monomer is styrene.

8. The process of claim 7 wherein the peroxyester is t-butyl peroxybenzoate, the copper salt is cupric chloride, and the additional metal salt is ferric chloride.

9. The process of claim 1 wherein the peroxyester is selected from the group consisting of t-butyl peroxybenzoate, t-butyl peroxy-2-ethylhexanoate, t-butyl peroxyacetate, t-butyl peroxyisobutyrate, t-amyl perbenzoate, t-amyl peroxy-2-ethylhexanoate, and di-t-butyl diperoxyazelate.

10. The process of claim 1 where an additional mercapto compound is present selected from the group consisting of n-dodecylmercaptan, n-octadecylmercaptan, d-limonene dimercaptan, methyl-3-mercaptopropionate, 2-mercapto ethyl palmitate, dibutyl mercaptosuccinate, isothiourea, ethylene isothiourea, ferrous mercaptobenzothiazolate, and cupric mercaptobenzothiazolate.

* * * * *